Figure 4:
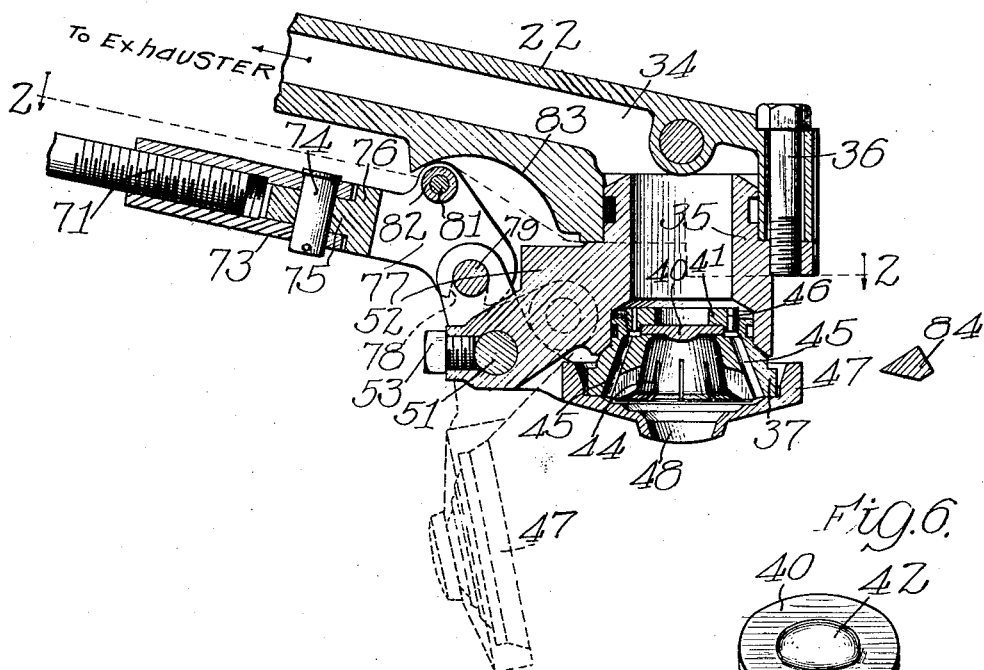

A. KADOW.
GATHERING MECHANISM FOR GLASS WORKING APPARATUS.
APPLICATION FILED SEPT. 7, 1912.
1,204,878.
Patented Nov. 14, 1916.
3 SHEETS—SHEET 1.
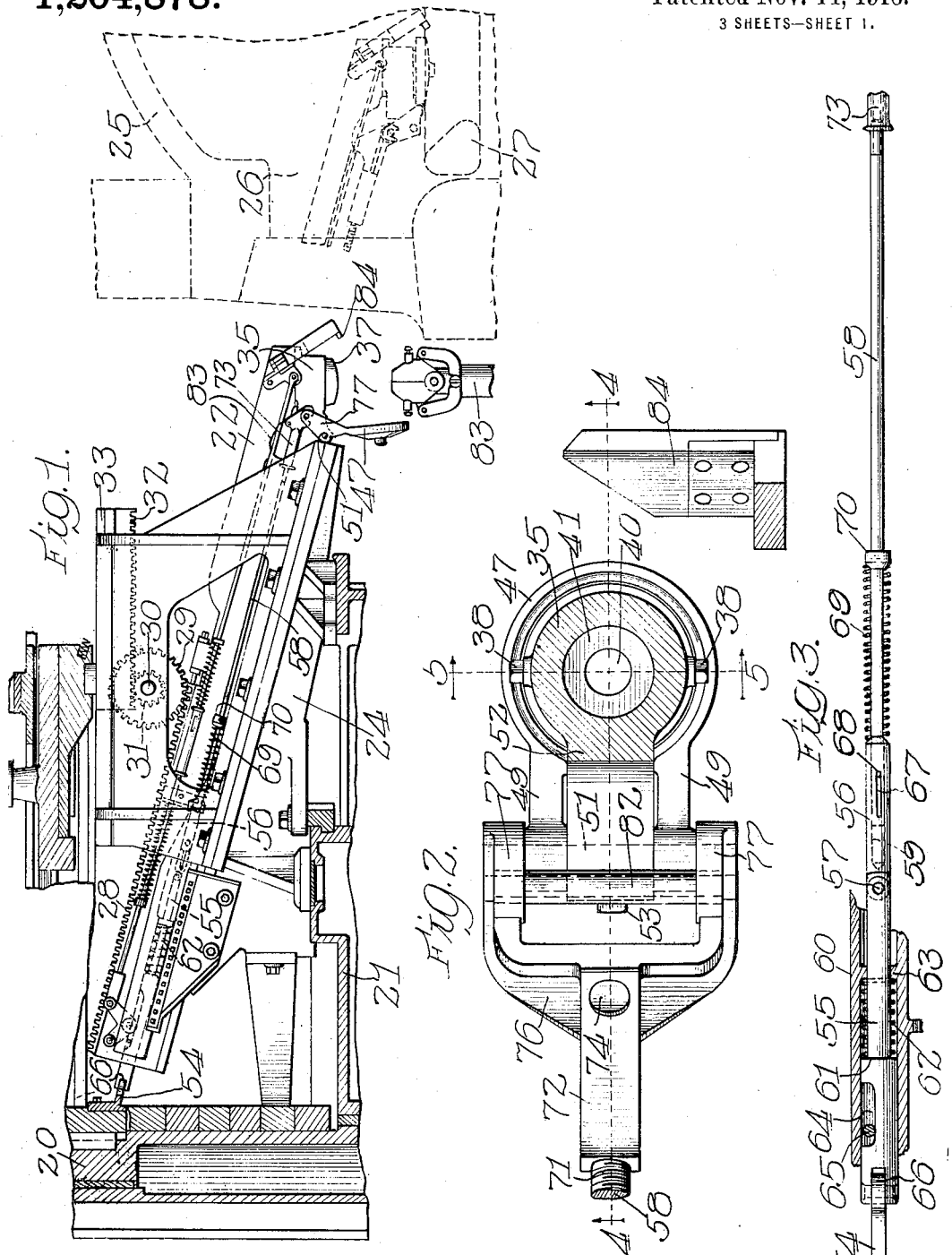

A. KADOW.
GATHERING MECHANISM FOR GLASS WORKING APPARATUS.
APPLICATION FILED SEPT. 7, 1912.
1,204,878.
Patented Nov. 14, 1916.
3 SHEETS—SHEET 3.
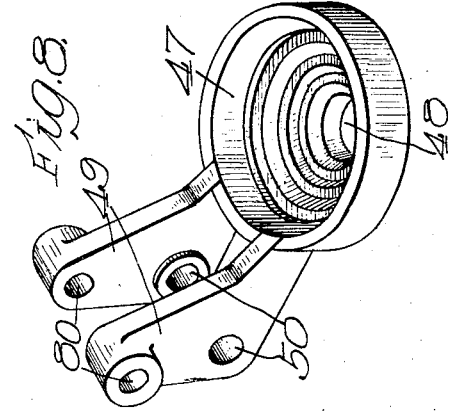
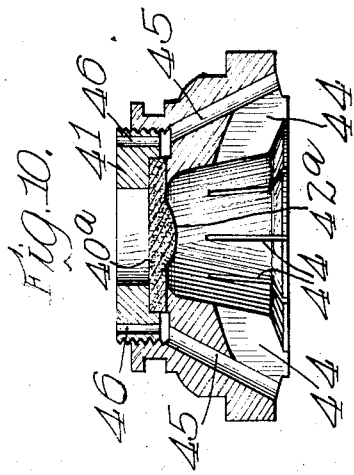
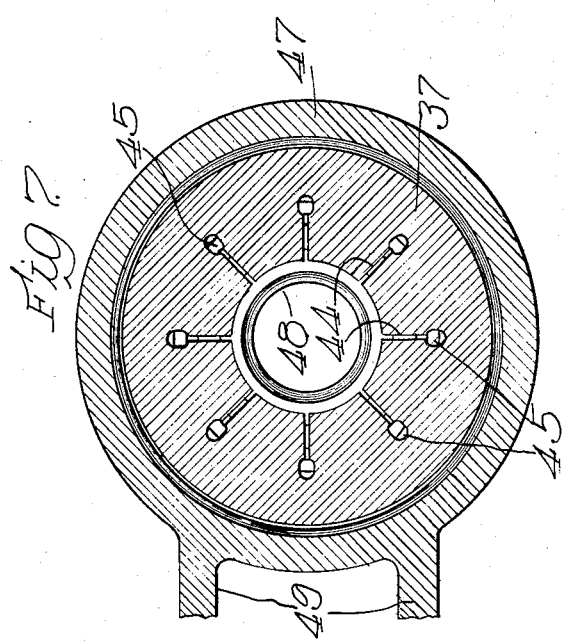
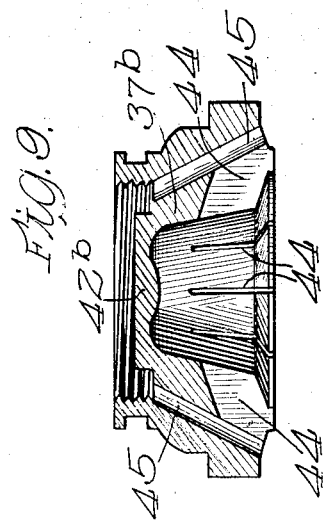
Witnesses:
Inventor:
August Kadow

UNITED STATES PATENT OFFICE.

AUGUST KADOW, OF TOLEDO, OHIO, ASSIGNOR TO THE WESTLAKE MACHINE COMPANY, OF TOLEDO, OHIO, A CORPORATION OF OHIO.

GATHERING MECHANISM FOR GLASS-WORKING APPARATUS.

1,204,878. Specification of Letters Patent. Patented Nov. 14, 1916.

Application filed September 7, 1912. Serial No. 719,178.

*To all whom it may concern:*

Be it known that I, AUGUST KADOW, a citizen of the United States, residing at Toledo, in the county of Lucas and State of Ohio, have invented certain new and useful Improvements in Gathering Mechanism for Glass-Working Apparatus, of which the following is a specification.

My invention relates to glass working apparatus and particularly to means for gathering glass from a glass pot or furnace.

A primary object of the invention is to provide a gathering mechanism of novel and improved construction comprising a mold into which the molten glass is drawn by suction so as to form a blank or body of glass of the desired size and configuration, the mold being constructed in separable parts which are adapted to separate so as to permit the removal of the blank when formed, for example, so as to deliver the same to another mechanism for further treatment.

The invention has for a specific object certain improvements upon the gathering mechanism shown in my application for patent entitled Glass working machine, filed July 6, 1910, Serial No. 570,621; among other things to provide a single cover or lower mold element in place of the plurality of rocking mold elements called "neck molds" in said application; to provide suitable means for moving said lower mold element into and out of engagement with the upper mold element, and a novel construction for the upper mold element whereby the lower element will properly and accurately engage therewith; and to provide a mold the configuration and construction of which overcome difficulties and defects in the operation of the machine as originally designed and constructed.

In the operation of the machine shown in my application above referred to the blank is discharged from the gathering mechanism into a spindle which thereupon inverts the blank, swings it back and forth and blows it out into a hollow, elongated bulb, the specific purpose of the machine being the formation of glass vessels of suitable form and character for use as incandescent electric light bulbs. It was found that some of the bulbs turned out by the machine as originally constructed were defective in that the walls of the bulbs were not of uniform thickness, the glass being thicker at the enlarged end of the bulb than at the neck. This defect was shown to be due, in part at least, to the too rapid cooling of the upper or inner end of the gather. The cavity of the gathering mold is necessarily rounded to give the blank the proper form, and it has been found desirable to taper the mold toward its upper end in order to insure a certain and quick delivery of the blank when the mold is opened up. In a blank formed in a mold of this configuration the tip tends to cool more rapidly than the body of the blank because of its diminishing cross sectional areas.

The improvement constituting my present invention provides, among other novel and useful features, a mold of a form and construction which will effectually prevent the tip of the blank from cooling too rapidly.

The invention provides several expedients each, or preferably all, of which may be used. In the first place, the top of the mold is made with an inwardly extending protuberance. The cavity of the mold has to be tapered toward the top in order that the blank may be readily discharged. The diminished sides of the blank at the top results in the top part of the blank losing its heat and becoming congealed more quickly than the bottom. The effect of this is likely to be the production of a bulb the bottom of which is too thick and the neck too thin. In the second place, instead of making the mold element which is formed with the cavity of one piece of metal it is made in two pieces, a body and a top piece, the latter having the protuberance, and being secured to the body. The top piece is preferably much thinner than the body. Apparently this results in the top piece heating up more rapidly than the body. When it approaches the limit of its capacity for absorbing heat it acts as an insulator so that the portion of the blank in contact therewith is kept hotter than the sides of the blank which are in contact with the thicker walls of the body of the mold. Preferably the body is made of copper. The top piece may also be made of copper but I preferably make it of graphite.

The invention has for further objects such other new and improved constructions, arrangements and devices in glass working apparatus as will be hereinafter described and claimed.

The invention is illustrated, in certain preferred embodiments, in the accompanying drawings, wherein—

Figure 6:
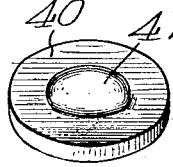
Figure 5:
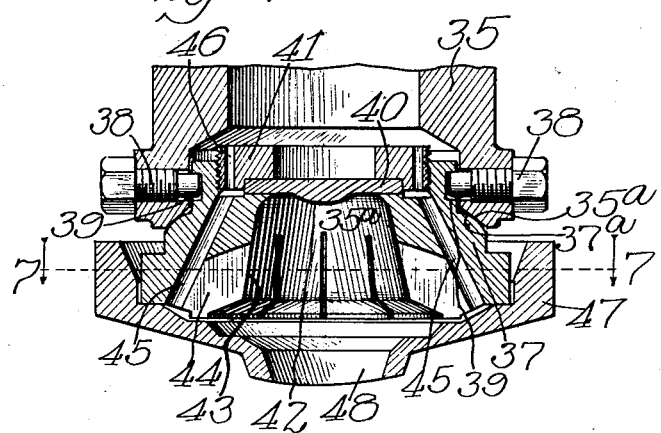

Figure 1 is a side elevation of a glass gathering mechanism showing in section certain associated parts of the machine of which said gathering mechanism forms a part; Fig. 2, a sectional view taken on line 2—2 of Fig. 4; Fig. 3, a detail view showing the construction of the operating rod employed for opening and closing the lower or swinging mold element; Fig. 4, a sectional view taken on line 4—4 of Fig. 2, looking in the direction of the arrows; Fig. 5, a sectional view taken on line 5—5 of Fig. 2, looking in the direction of the arrows; Fig. 6, a detail view, in perspective, of the top piece of the gathering mold shown in the preceding figures; Fig. 7, a sectional plan taken on line 7—7 of Fig. 5; Fig. 8, a view in perspective, of the lower or swinging mold element; Fig. 9, a detail section illustrating a modified construction of gathering mold, and Fig. 10, a similar view illustrating another modification.

Like characters of reference designate like parts in the several figures of the drawings.

The devices and combinations of devices constituting my present invention are illustrated as forming a part of a machine similar to that disclosed in my pending application referred to above. In that machine a plurality of gathering mechanisms are provided which rotate around a fixed axis or drum. In the present case only such portions of the machine, other than the gathering mechanism, are shown as have been thought necessary in order to make the nature of my improvements comprehensible. As will be clear from the following description, these improved constructions might be advantageously used in a machine which in its organization is quite different from the machine shown in my application.

Referring to the specific embodiment of the invention shown in the drawings, 20 designates a stationary drum, 21 a support which revolves about said drum, 22 a longitudinally movable member, which will be termed for convenience the ram, 23 a housing through which the ram slides, and 24 a carriage supporting the ram and having a lateral movement on the support 21; although so far as the present invention is concerned the movement of the carriage 24 with respect to the support may be ignored.

25 designates the glass furnace or pot having the working opening 26.

27 designates the usual ring of refractory material which floats on the metal and through which the metal is gathered. The ram 22 is given at the appropriate time a forward or radial movement which projects it into the working opening of the furnace, bringing the gathering mold (to be hereinafter described) into contact with the molten glass in the furnace. When the gather has been made the ram is withdrawn from the furnace. While any suitable apparatus might be employed for giving these reciprocating movements to the ram, I have shown the same apparatus as is described and shown in my pending application referred to. The ram is provided with a rack 28 which is meshed by a pinion 29 on a shaft 30 mounted in the housing 23. In fixed relation with pinion 29 is a smaller pinion 31 which is meshed by a rack 32 formed on the under side of a slide 33. Any suitable mechanism may be employed for reciprocating the slide 33.

The ram 22 is formed with the air passage 34 extending therethrough, which, at the moment of gathering, is put into communication with suitable exhausting means by mechanism not shown herein. Into the outer extremity of the ram is fitted a mold supporting sleeve 35, the sleeve being secured to the ram by means of a bolt 36. The body portion 37 of the upper mold element fits loosely into the flared end of the sleeve 35 and is held in place by means of the screws 38 which extend through the sleeve and into recesses 39 in the side of the mold element. The recesses 39 are larger in cross sectional area than the ends of the screws 38. This gives the mold element a loose or floating relation with respect to the ram. Preferably one of the contacting surfaces 35$^a$, 37$^a$ of the support 35 and mold element 37 respectively, is rounded as shown so that the mold has a rocking bearing on the ram. In the construction shown in all of the figures except Fig. 9 the upper mold element is composed of a body part 37 described, and of a separately formed top part 40 held in place in the body by the nut 41. The body part of the mold is preferably made of copper although it might be made of other metal. The top piece 40 may also be of copper and it is formed, preferably, with the convexity or protuberance 42. The mold cavity 43 is tapered toward the top so that the blank when formed will not stick to the mold. While the top piece may be made of metal I preferably make it of a piece of graphite 40ª (Fig. 10) formed with the protuberance 42ª. The glass even when at a very high temperature will not stick or fuse to the graphite. The use of graphite also seems to be efficacious in keeping the top of the blank hotter than the rest of its superficial parts. Possibly this is because of the relatively great thermal capacity of graphite. After continued use it apparently becomes hotter than the rest of the mold and so diminishes the loss of heat by conduction from the top of the blank. Whatever may be the reasons I have gotten very excellent results by using a small piece of graphite as shown in Fig. 10, although as stated good results may also be obtained by making the top piece of copper.

In Fig. 9 an upper mold element is shown consisting of a single body of metal 37ᵇ, the top being formed with the protuberance or convexity 42ᵇ projecting downwardly into the mold cavity. Some measure of the advantages of my invention may be obtained by using a mold of this sort although it is preferable to make the top piece separate from the body for the reasons stated.

The body portion 37 of the mold is formed with a number of radiating slots 44 which extend from the cavity to the ports 45 which latter communicate by means of ports 46 in the nut 41 with the interior of sleeve 35 and with the air passageway 34 of the ram. In practice the slots 44 are extremely narrow, being about one six-thousandths of an inch wide. The drawings, for purposes of illustration, show them greatly exaggerated.

The lower mold element consists of a circular member 47 formed with the central opening or inlet port 48 and with the projecting arms 49, 49 provided with the perforations 50, 50 for the pivot pin 51 which extends through the perforations 50 and through an opening in a lug 52 formed on the sleeve 35. The arms 49 straddle the lug 52. The pivot pin is fixed in the lug by means of the set screw 53. The lower mold element is thus pivoted to the sleeve 35 so that it may be moved into and out of contact with the upper mold element 37. The latter has a loose or floating relation with the sleeve 35 so that an accurate and close engagement is made between the parts of the gathering mold. The loose connection of the mold to the ram has another advantage. The glass is drawn up into the mold by exhausting the air therefrom. The exhausting process necessarily cools the glass. Therefore, as it does not require as intense a vacuum to hold the blank in the mold as is necessary for sucking up the molten glass from the furnace, I have found it desirable to diminish the force of the exhaust by throttling, without closing, the exhaust duct. If the mold be loose on the ram the weight of the blank will pull the mold down and break the vacuum as soon as the force of the suction has been decreased and the lower mold element or cover thrown back. By rounding the surface 37ª an accurate fit and perfect air seal is insured at the time when the mold is drawn or forced up against the surface 35ª with which the rounded surface 37ª contacts. The lower mold element is swung on its pivot back and forth to open and close the gathering mold by means of what may be termed an operating rod (Fig. 3) which is moved in one direction by a spring and in the other by being brought into contact with a cam or abutment which is fixed on the drum 20.

The operating rod consists of two members 55 and 56 hinged together at 57, and of a rod 58 which telescopes into a socket 59 formed in the member 56. The member or rod 55 slides in a guide 60 on the ram, the rod being formed with a shoulder 61 and a spring 62 being interposed between the shoulder and an annular shoulder 63 on the inner surface of the guide. The upper end of the member 55 is formed with the notch 64 for the stop pin 65. 66 is a roller on the upper extremity of the operating rod. The roller comes into contact with the cam 54. The socket member 56 is formed with a slot 67 through which extends a pin 68 on the rod 58.

69 is a spring interposed between the end of the socket member 56 and a collar 70 on the rod 58. The lower end of the rod 58 is threaded, as indicated at 71, and engages adjustably with the casting 72. The latter terminates in a fork 73 to which is pivoted by means of a pin 74 the tongue 75 of a fork member 76, the arms 77 of which straddle the arms or lugs 49 on the lower mold element 47 and are formed with notches 78 which engage a pin 79 mounted in the perforations 80 formed in the arms 49. Extending across the space between the members 77 is a rod 81 carrying the antifriction roller 82. The portion of the under surface of the ram which is directly above the forked member 76 is formed on a curve 83 (Fig. 4) so that it serves as a guide for the fork if by any too quick action of the operating rod the fork should have a tendency to jump out of engagement with the pin 79.

The operation of the apparatus above described is as follows: The movement inward of slide 33, which, if the machine is of the rotary type shown and described, is timed to take place when the gathering mechanism has come opposite the working opening 26 of the furnace, projects the ram into the working opening. The first movement outward of the ram frees roller 66 from the cam 54 and the spring 62 moves the operating rod to close the mold. The continued forward movement of the ram brings the gathering mold into contact with the metal in the furnace, this position of the apparatus being shown in the dotted lines in Fig. 1. The air is exhausted from the passageway 34 in the ram and from the mold by a properly timed connection between the passageway 34 and exhausting apparatus. The glass is sucked up through the opening 48 into the mold. The movement of the slide 33 outwardly withdraws the ram from the furnace and eventually brings the roller 66 against the cam or abutment 54 which opens the mold by moving the lower mold element 47 to the dotted line position of Fig. 4, that is, the full line position of Fig. 1. The operating rod is jointed at 57 so as to allow for the swinging movement of the lower mold element. It is made telescopic and provided with the springs 62 and 69 in the arrangement described, so that the action in closing the mold will be impositive and cushioned, and so that there will be no danger that the operating connection will be buckled when moved to open the mold. It is possible that the lower mold element may stick to the upper element and resist the opening movement of the operating rod. With the construction shown and described, if this happens the spring 69 compresses, allowing the rod 58 to slide back into the socket member 56. If some such arrangement as this were not provided the operating connection might be buckled when the roller 66 met the cam 54.

It will be understood that when the apparatus of my present invention is used as a part of an improvement upon the glass working machine shown in my pending application above referred to, the opening of the mold delivers the blank to a spindle device designated 85 in the drawings. As this device forms no part of my present invention it need not be described. The upper mold being tapered the blank is readily discharged therefrom when the lower mold element is swung out of the way. The apparatus is preferably provided with an automatically operated cut-off knife 84 but as this device forms no part of the present invention it will not be described.

While I have shown and described my invention as embodied in certain preferred mechanisms, it will be readily understood that modifications might be devised without departure from the invention. Therefore, I do not wish to be understood as limiting the invention to the particulars described and claimed.

I do not claim herein the features of construction of the mold considered by itself as this invention is made the subject matter of a divisional application Serial No. 872,192 filed November 14, 1914.

I claim:

1. In apparatus for making glass articles, the combination with a movable ram, of a gathering mold consisting of a fixed upper mold element and a pivoted lower mold element, and mechanism for moving said pivoted mold element on its pivot comprising an operating rod, an abutment against which the rod is thrust by the movement of the ram to move the pivoted element to its open position, and a spring for moving said rod in the opposite direction, said rod comprising telescoping members and a spring connecting said members together.

2. In apparatus for making glass articles, the combination with supporting means, of an upper mold element open at the bottom and having a loose or floating relation with said supporting means, a lower mold element having a central inlet port and pivotally mounted on said support and means for moving the same into and out of contact with said upper mold element.

3. In apparatus for making glass articles, the combination with supporting means, of an upper mold element having a flaring opening at the bottom, and provided with vacuum conduits, a ringlike lower mold element the opening in which is smaller in diameter than the opening in the bottom of the upper mold element and means for moving the same into and out of contact with said upper mold element.

4. In apparatus for making glass articles, the combination with supporting means, of an upper mold element having a flaring opening at the bottom, and provided with vacuum conduits, a ringlike lower mold element, the opening in which is smaller in diameter than the opening in the bottom of the upper mold element and which is pivotally mounted on said supporting means and means for moving the same into and out of contact with said upper mold element.

5. In apparatus for making glass articles, the combination with supporting means, of an upper mold element open at the bottom, and provided with vacuum conduits, a ringlike lower mold element pivotally mounted on said supporting means and means for moving the same into and out of contact with said upper mold element.

6. In apparatus for making glass articles, the combination with a movable gathering device, of an upper mold element carried thereby which is open at the bottom, and provided with vacuum conduits, a ring-like lower mold element pivoted to said gathering device, and mechanism actuated by the movement of the gathering device for moving said pivoted element into and out of contact with the under side of said upper mold element.

7. In apparatus for making glass articles, the combination with a movable gathering device, of an upper mold element carried thereby which is open at the bottom, and provided with vacuum conduits, a ring-like lower mold element pivoted to said gathering device, mechanism actuated by the movement of the gathering device for moving said pivoted element into and out of contact with the under side of said upper mold element, comprising a stationary cam, and an operating rod connected with said lower mold element which comes into engagement with said cam.

8. In apparatus for making glass articles, the combination with a movable gathering device, of an upper mold element carried thereby which is open at the bottom, and provided with vacuum conduits, a ring-like lower mold element pivoted to said gathering device, mechanism actuated by the movement of the gathering device for moving said pivoted element into and out of contact with the under side of said upper mold element comprising a stationary cam and an operating rod connected with said lower mold element which comes into engagement with said cam, said operating rod comprising telescoping members and yielding means connecting the same.

9. In apparatus for making glass articles, the combination with a movable ram, of an upper mold element having a loose or floating relation with said ram and open at the bottom, a rink-like lower mold element pivoted to said ram, and mechanism actuated by the movement of said ram for moving said lower mold element on its pivot into and out of contact with said upper mold element.

10. The combination with a support, of a mold element rockingly hung therefrom, a coöperating mold element arranged to make an air-tight closure therewith, and means for actuating said last named element to close and open said first named mold element.

11. The combination with a support, of a mold element pivotally supported thereon at opposite points, a coöperating mold element adapted to make an air-tight closure therewith, and means for moving the last named element into and out of engagement with the first named element.

12. The combination with a support provided with exhaust passages, of a mold element, rockingly mounted on said support, provided with ports communicating with said exhaust passages, the chamber in said mold element flaring outwardly and downwardly, a second mold element, provided with a gathering port, and adapted to make a tight joint with said first named element, and means for moving said second mold element into engagement with the first mold element for gathering and for disengaging said elements to permit delivery of the gather by gravity.

13. The combination with a support provided with an exhaust passage and with a chamber communicating with said passage, of a mold member supported in said chamber, normally held in a position to provide an air passage between said mold member and the wall of said chamber, and movable in the opposite direction to close said passage, said mold member having a gathering chamber with ports in the wall thereof communicating with said exhaust passage adapted to be closed by a gather in said gathering chamber.

14. In glass gathering apparatus, the combination with a support provided with a chamber and an exhaust passage leading therefrom, of a mold element rockingly mounted in said chamber and movable therein to close communication between the mouth of said chamber and said exhaust passage, said mold element having a chamber with a downwardly flaring wall and ports in said wall communicating with said exhaust passage, a second mold element provided with an induction port, and means for causing said second mold element to engage said first named mold element for making a gather, and to disengage said element to permit delivery of the gather.

15. In apparatus for making glass articles, the combination with a support having an exhaust passageway, of a mold, the cavity of which communicates with said passageway, comprising a mold element which has a loose connection with said support, said element and support provided with contacting surfaces, one of which is rounded, means for holding said contacting surfaces together.

16. In apparatus for making glass articles, the combination with supporting means, having an exhaust passageway of a mold element communicating with said passageway having a loose or floating relation with said supporting means, and a coöperating mold element movably mounted so as to be movable into and out of contact with said floating mold element, said mold element and said supporting means provided with contacting surfaces, one of which is rounded.

17. The combination with a rockingly suspended mold element, of a co-engaging mold element and means for actuating the same, comprising a pivotally jointed operating rod, said rod comprising two members telescoped together, and a spring for holding them in extended relation, positive means for actuating said rod to open said mold members, and resilient means for actuating said rod in the opposite direction.

18. In apparatus for making glass articles, the combination of a revoluble support, a ram mounted for rotation with said support and for movement thereon radially, a mold carried by said ram comprising a mold element fixed thereon, and a co-engaging mold element pivoted to the fixed element; and mechanism for moving said pivoted mold element into and out of contact with the fixed element, coöperating with said revoluble support and adapted to bring the mold elements into contact when said ram moves radially from said support, and to open said elements when the ram moves radially toward the support.

AUGUST KADOW.

Witnesses:
LEO J. GOLDMAN,
CLARENCE STEINEM.

Copies of this patent may be obtained for five cents each, by addressing the "Commissioner of Patents, Washington, D C."